R. AUCUTT.
Milk-Cooler.
No. 215,426.    Patented May 20, 1879.
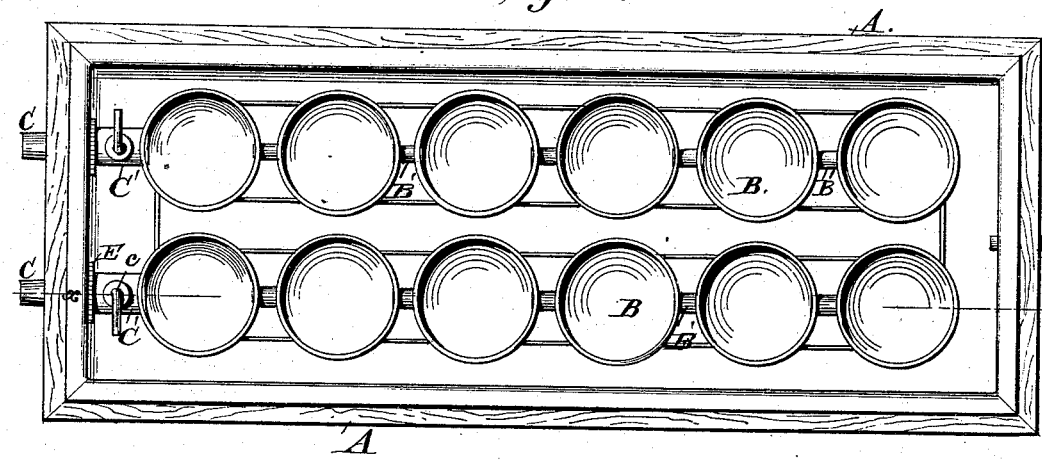
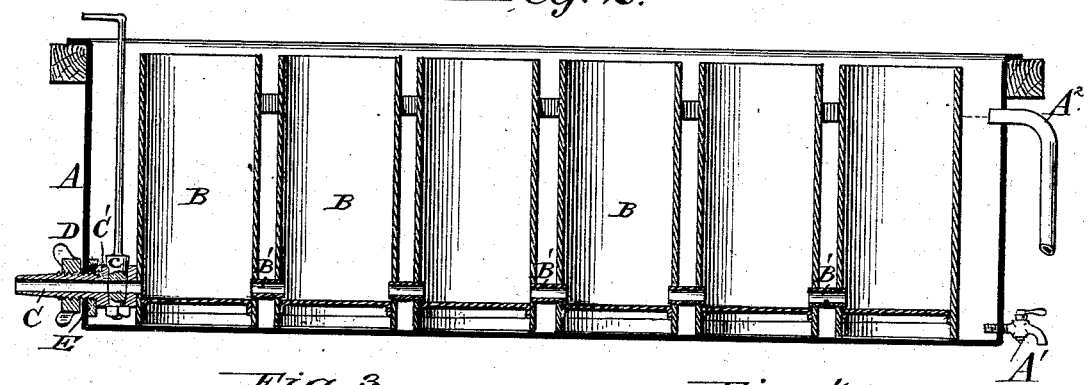
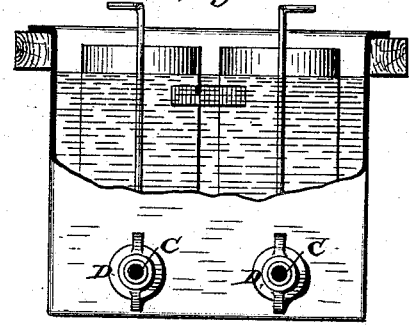 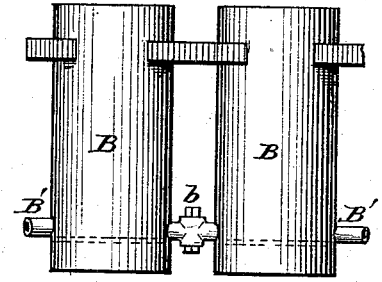
Attest:
H. L. Perrine,
Chas. A. Kah.
Inventor.
Rozell Aucutt
by his attorney

UNITED STATES PATENT OFFICE.

ROZELL AUCUTT, OF SAND SPRING, IOWA.

IMPROVEMENT IN MILK-COOLERS.

Specification forming part of Letters Patent No. 215,426, dated May 20, 1879; application filed February 17, 1879.

*To all whom it may concern:*

Be it known that I, ROZELL AUCUTT, of Sand Spring, in the county of Delaware and State of Iowa, have invented certain new and useful Improvements in Milk-Coolers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to that class of apparatus designed for the cooling of milk.

It consists in arranging a series of cooling receptacles or vessels connected at the bottom by pipes within a tank, and providing them with an outlet or discharge pipe in common, so that the whole of the series may be filled equally by pouring milk into any one of the vessels, and the milk may be drawn evenly and simultaneously from the bottom of all of the series and allow the cream that has formed to remain and be drawn off separately afterward.

In the accompanying drawings, Figure 1 is a top-plan view of my improved cooler within the tank. Fig. 2 is a longitudinal section on the line $xx$, Fig. 1. Fig. 3 is an end view, the tank being partly broken away. Fig. 4 is a detail view, showing the stop-cock between the coolers.

The same letters of reference are used in all the figures to designate identical parts.

The tank A may be of the form shown, or of any other desired configuration. It is provided with an educt-pipe, $A^1$, and an overflow-pipe, $A^2$, the former at the bottom of the tank, and the latter at a little distance below the tops of the cooling-vessels, as shown.

The cooling-receptacles B are deep narrow vessels connected at the bottom by pipes B', and are provided with a discharge-pipe, C, which is connected, in this instance, to the last one of the series of cooling-vessels B.

The pipes B' are of such size that milk poured into one of the vessels B will immediately flow through these pipes into all the other vessels of the series and attain a common level therein.

The cooling-vessels may be made of the ordinary shallow milk-pans, or in any other form; but I prefer to use the deep narrow vessels shown.

The pipes B' may be open, as shown, or they may be provided with cocks $b$, so that for a small quantity of milk only a limited number of the vessels need be used.

The tank A may be made to hold one or more series of cooling-vessels, as desired.

The discharge-pipe C is provided with a shoulder, C', which, when the vessels B are in the tank and the pipe projecting through its side or end, abuts against said side or end. This pipe is screw-threaded outwardly from the shoulder C' to receive a thumb-screw, D, which is used to draw said shoulder tight against the wall of the tank to make a water-tight joint between said shoulder C' and the tank. I have found it advisable to use a washer, E, between the shoulder C' and the wall of the tank.

It will be seen that the cooling-vessels can at any time, by unscrewing the nut D, be taken out of the tank for scalding or repairs.

The discharge-pipe C is provided with a cock, $c$, between the cooling-vessel to which it is attached and the tank, so that the milk may stand or run, according as the cock is shut or open.

The cooling-vessels B may be provided with suitable covers, so as to exclude dust and other light foreign matters, but to admit light. To this end the covers may be made of wire-gauze or of glass.

By the use of the overflow-pipe $A^2$ a continuous circulation of cold water may be maintained around the cooling-vessels.

A means may be provided by which the rear end of either the tank or the coolers may be elevated in order to draw off the cream after the milk has been first drawn off.

Instead of placing the whole of a series of cooling-vessels in one tank, each one of the series may have a separate tank, the object being the immersion of the cooling-vessel in water or other cooling agent.

The pipes B' may be dispensed with and some other means provided by which the cooling-vessels may intercommunicate at the bottom.

What I claim as my invention, and desire to secure by Letters Patent, is—

In a milk-cooler, the combination, with a tank, of a series of milk-receptacles or cooling-vessels placed within said tank, said vessels intercommunicating at the bottom through pipes, and one of the series being provided with a discharge-pipe extending through the wall of the tank for drawing the milk simultaneously from the bottom of all of the series, all substantially as hereinbefore set forth.

In testimony that I claim the foregoing as my own I affix my signature in presence of two witnesses.

ROZELL AUCUTT.

Witnesses:
LEONARD GOPPELHOLZ,
ASA C. BOWEN.